United States Patent [19]

Samuel

[11] Patent Number: 5,351,400
[45] Date of Patent: Oct. 4, 1994

[54] CONVERTING AND REINFORCING VEHICLES

[76] Inventor: Andrew J. Samuel, 57 Wyuna Drive, Noosaville QLD 4566, Australia

[21] Appl. No.: 30,435
[22] PCT Filed: Feb. 6, 1991
[86] PCT No.: PCT/AU91/00040
§ 371 Date: Jul. 13, 1993
§ 102(e) Date: Jul. 13, 1993
[87] PCT Pub. No.: WO91/12164
PCT Pub. Date: Aug. 22, 1991

[30] Foreign Application Priority Data

Feb. 6, 1990 [AU] Australia .............. PJ8454

[51] Int. Cl.$^5$ .............................. B23P 17/00
[52] U.S. Cl. .................... 29/897.1; 29/401.1; 29/897.2; 296/186; 296/203
[58] Field of Search ........... 29/401.1, 402.08, 402.09, 29/402.14, 402.16, 525.1, 897.1, 897.2; 296/10, 107, 120.1, 186, 188, 202, 185, 205, 203; 228/119

[56] References Cited

U.S. PATENT DOCUMENTS

| | | | |
|---|---|---|---|
| 3,718,364 | 2/1973 | Fischer et al. | 296/28 |
| 4,307,911 | 12/1981 | Pavlik | 296/188 |
| 4,346,930 | 8/1982 | Northey | 29/401.1 X |
| 4,662,052 | 5/1987 | Draper | 29/401.1 |
| 4,712,828 | 12/1987 | Albrecht | 29/401.1 X |
| 4,729,156 | 3/1988 | Norris, Jr. et al. | 29/401.1 |

FOREIGN PATENT DOCUMENTS

| | | |
|---|---|---|
| 0233670 | 2/1987 | |
| 0354325 | 6/1989 | European Pat. Off. |
| 3427537 | 2/1986 | Fed. Rep. of Germany |

*Primary Examiner*—Mark Rosenbaum
*Assistant Examiner*—S. Thomas Hughes
*Attorney, Agent, or Firm*—Kimmel, Crowell & Weaver

[57] ABSTRACT

A method for converting a vehicle from a sedan form to a convertible form and reinforcing the vehicle, the vehicle having a door opening with hinge mounts for the normal door hinges on one side of the door opening and a latch mount for a door latch on the opposite side of the door opening, the method involving the steps of removing the door and its associated hinges and latch from the door opening and locating a reinforcing structure within the door opening and securing the structure to the hinge mounts and latch mounts by bolting using bolts into the preexisting hinge and latch mounting holes.

19 Claims, 3 Drawing Sheets

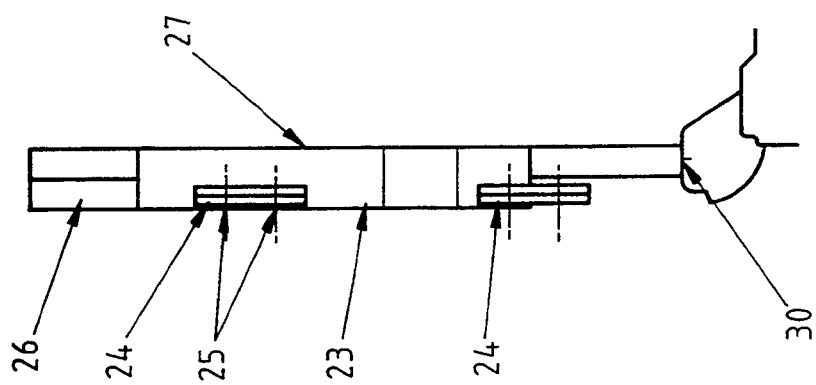
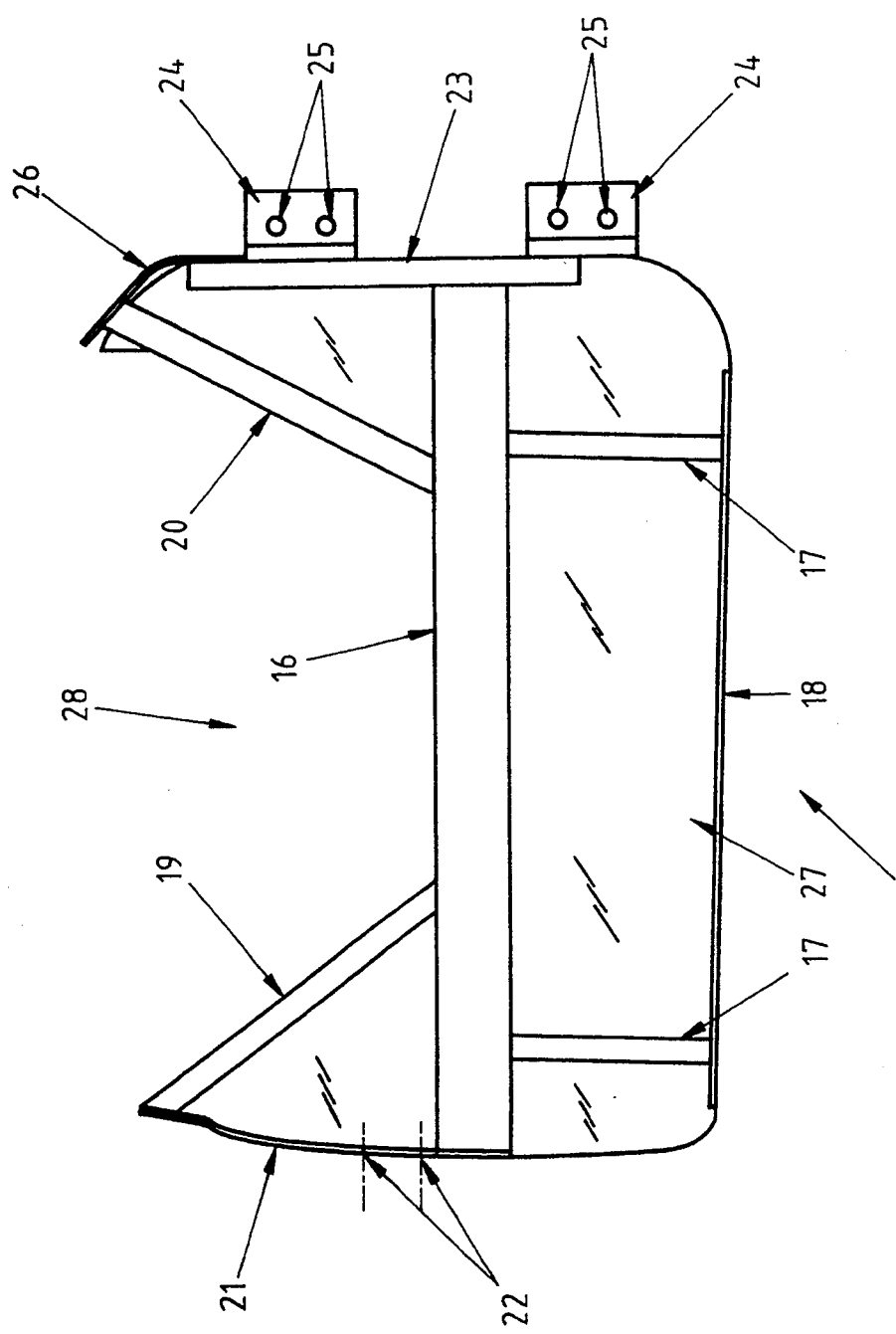

CONVERTING AND REINFORCING VEHICLES

TECHNICAL FIELD

THIS INVENTION relates to improvement to vehicles and in particular to a method and means for converting conventional type vehicles to convertible or open topped form.

BACKGROUND ART

Whilst some convertible vehicles are manufactured on an assembly line there is a limited availability and range of such vehicles. It has thus become common practice for standard sedan type vehicles to be made into convertible form for different applications, for example for use in hire vehicle fleets in say, resort areas. For this purpose, the hard top of the vehicle is removed and replaced with a soft top which may be erected when desired or left open so as to leave the occupants exposed to external weather conditions.

Removal of the hard top or roof of a vehicle creates a number of difficulties as strength of the vehicle is often, as a consequence, reduced necessitating reinforcing in a number of different ways. Such reinforcing often takes the form of under floor reinforcing which is required to be secured to the floor of the vehicle by welding or other rigid connection means. Such reinforcing is required to be particularly strong and extensive and accordingly the material costs and the labour costs of installing same tend to be relatively high resulting in an overall high cost of conversion.

DISCLOSURE OF INVENTION

The present invention aims to overcome or alleviate the above disadvantages by providing an improved method and means for converting conventional vehicles into open top or convertible form in a rapid and efficient manner whilst retaining the requisite strength in the vehicle. The present invention also provides a method and means for reinforcing converted motor vehicles.

The present invention thus provides in a first aspect a method of converting a vehicle of the type including at least one door opening adapted to be closed by a door, hinge mounting means at one side of said opening for mounting hinge means for hingedly supporting said door, and latch mounting means at the opposite side of said door opening for mounting latch means for latching said door in a closed position, said method including the steps of providing rigid frame means adapted for location within said door opening to extend between opposite sides thereof and rigidly securing said frame means in said door opening at least at said hinge and latch mounting means.

In a second aspect, the present invention provides a method of reinforcing a vehicle of the type having at least one door opening adapted to be closed by a door, hinge mounting means at one side of said opening for mounting hinge means for hingedly supporting said door, and latch mounting means at the opposite side of said door opening for mounting latch means for latching said door in a closed position, said method including the steps of providing a said vehicle with said door absent from said door opening, providing rigid frame means adapted for location within said door opening to extend between opposite sides thereof and rigidly securing said frame means in said door opening at least at said hinge and latch mounting means.

Preferably said frame means includes a longitudinally extending frame member provided with bracket means at opposite ends thereof for mounting to said hinge and latch mounting means at opposite sides of said door opening. Normally said hinge and latch mounting means include threaded bores to enable the hinge and latch means to be secured thereto. In one preferred form the bracket means are secured to the latch and hinge mounting means by means of screw fasteners suitably bolts passed through the opposite brackets and engaged in the pre-existing threaded bores for the door hinge and latch means. Alternatively, the brackets may be welded to the latch and hinge mounting means.

Most preferably, the frame means is provided with sheeting which extends to the door sill and opposite sides of the frame, the sheeting being adapted to be secured at least to the sill of the door opening.

The present invention also provides reinforcing means for reinforcing a vehicle, said reinforcing means being adapted for location in a door opening of a vehicle, said vehicle including hinge and latch mounting means at opposite sides of said door opening, said reinforcing means including an elongated frame member, bracket means at opposite ends of said member adapted for alignment with said hinge and latch mounting means, and means for rigidly securing said bracket means to said latch and hinge mounting means.

BRIEF DESCRIPTION OF THE DRAWINGS

Reference will now be made to the accompanying drawings which illustrate the preferred embodiment of the invention and wherein:

FIG. 2 is a side elevational view of the reinforcing means of the invention;

FIG. 3 is an end elevational view of the reinforcing means of FIG. 2 associated with the sill of the vehicle.

BEST MODE FOR CARRYING OUT THE INVENTION

Figure 1:
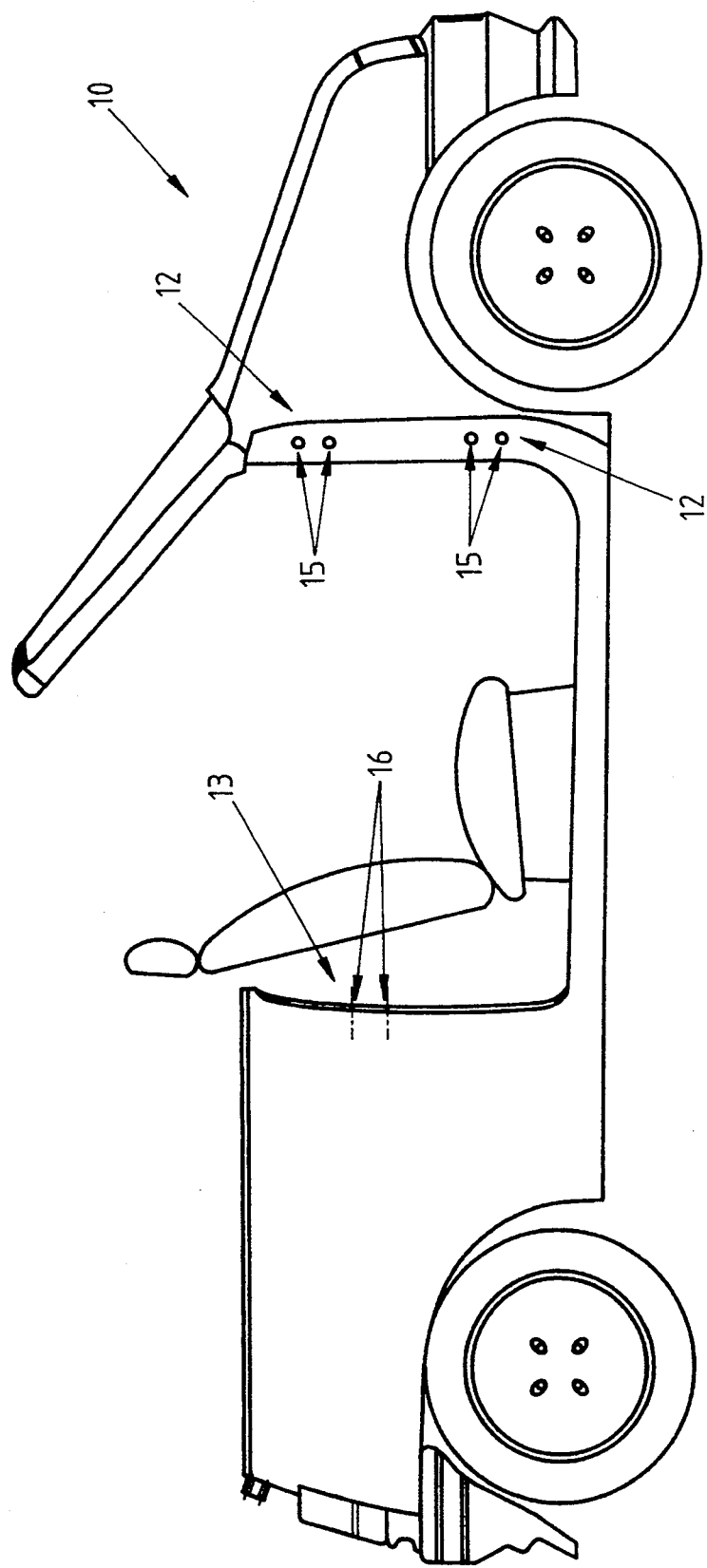
FIG. 1 is an elevational view illustrating a vehicle prior to reinforcing in accordance with the present invention.

Referring to the drawings and firstly to FIG. 1 there is illustrated a vehicle 10 according to the present invention which has been converted to open topped form by having its roof removed. The vehicle 10 is provided with its doors absent or alternatively the doors are removed from their associated openings and the doors are replaced with reinforcing means 11 in accordance with the present invention (see FIGS. 2 and 3). The vehicle doors are normally hingedly mounted via hinges at two hinge mounting points 12 on one side of the door opening and latched in a closed position via a latching member mounted at the latch mounting point 13 on the opposite side of the door opening. The hinge mounting point 12 and latch mounting point 13 are provided with threaded apertures or bores 15 and 16 respectively so as to enable respective hinges and latches for the vehicle door to be mounted to the vehicle. The points 12 and 13 are used in the present invention for the mounting of the reinforcing means 11.

As shown more clearly in FIGS. 2 and 3 the reinforcing means 11 includes a longitudinally extending main frame member 16 which preferably comprises a rolled hollow section or RHS. Further spaced apart frame members 17 are secured to the main frame member 16 and extend at right angles thereto to be secured at their free ends to a flat plate member 18 which is adapted to extend along the door sill. Two further frame members 19 and 20 are secured to the main frame member 16 on the si de thereof opposite the members 17 and extend at an angle from the member 16 away from each other to terminate in use at a position adjacent the trailing and leading sides of the door opening respectively. A flat sectioned member or bracket 21 is secured to the trailing end of the main frame member 16 and to the end of the inclined member 19, the member 21 being contoured to match the contour on the trailing side of the door opening. The member 21 is provided with apertures 22 which are adapted to be aligned with the normal latch mounting apertures 15 for the door latch which has been removed.

At the forward end of the reinforcing means 11, a further Frame member 23 is secured at right angles to the leading end of the frame member 16 and carries respective brackets 24 in the form of mounting pl ares which are spaced apart so as to be aligned in use with the normal hinge mounts 12 and which are apertured at 25 for alignment with the hinge mounting apertures 15. The reinforcing means 11 also includes a further plate 26 which is secured to the frame member 23 at the leading end of the frame member 19 to partly follow the contour of the leading side of the door opening. The respective frame members are preferably interconnected by welding and the inside of the reinforcing means 11 is covered by a sheet 27 stitch welded to the frame members of the reinforcing means 11. It will be apparent that the inclined frame members 19 and 20, and member 16 define a reduced height area 28 over which a user may step so as to enter the vehicle or alight therefrom.

Figure 4:
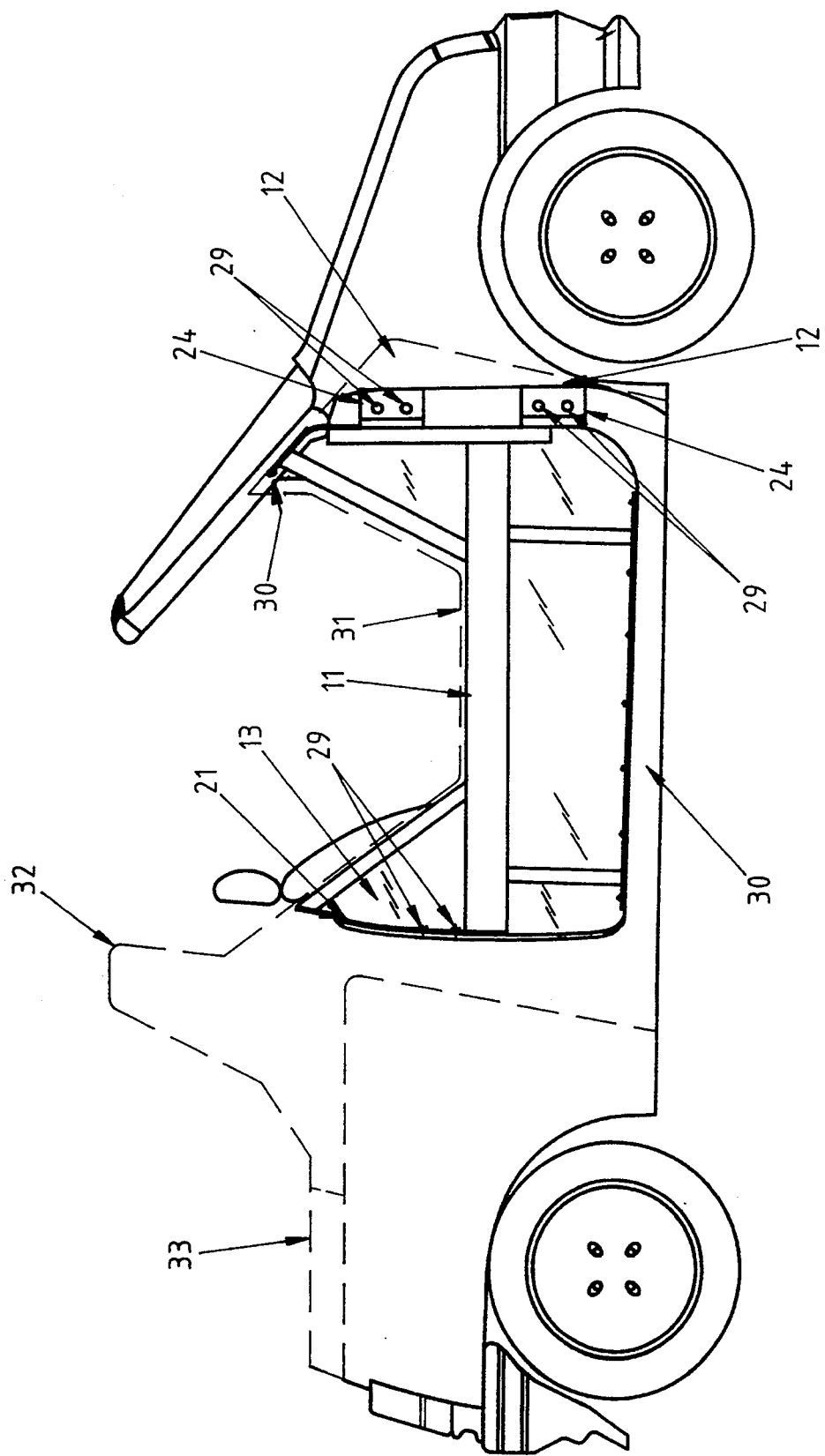
FIG. 4 is an elevational view illustrating the manner in which the vehicle is reinforced.

In use and where reinforcing of the vehicle is required as in situations where the vehicle is altered to convertible form the doors of the vehicle are removed as are the latches and hinges or alternatively the vehicle is supplied with the doors and latches and hinges absent and the reinforcing means 11 inserted in place of the doors as shown in Fi g. 4. Bolts 29 and preferably the original bolts for the hinges and latches are then used to secure the reinforcing means 11 in position, with the bolts 29 being passed through the apertures 22 in member 21 into the latch mounting holes 15 and through the apertures 25 in the brackets 24 into the hinge mounting apertures 14 and tightened. The reinforcing means 11 is further secured in position by pop riveting about its periphery into the vehicle si 11 and pillar as illustrated at 30, however, the main reinforcing is provided by rigid securing to the hinge and latch mounting points 12 and 13. For aesthetic purposes a shaded moulding 31 shown in FIG. 4 is placed over the reinforcing means 11. The insert 31 is suitably formed of fibre glass or any other material and also preferably includes a roll bar portion 32 which extends over a roll bar fitted to the vehicle 10. The vehicle 10 may also be provided with a rear seat moulding 33 again preferably formed of glass reinforced plastics.

As an alternative to securing the members 21 and 24 to the hinge and latch mounting points by bolting, they may be secured to those points by welding or any other fastening means which hold the reinforcing means 11 rigidly in position.

It will be apparent that the reinforcing means 11 may be of many different forms other than that shown and described. The frame members of the reinforcing means 11 may be of various configurations provided they include means which enable connection to the latch and hinge mounts of the vehicle. The member 18 may also be defined by a turned up portion of the sheet 27 as may the member 21. The members of the reinforcing means 11 preferably comprise steel members and the sheeting 27 comprises sheet metal. Preferably the members and sheeting are treated to reduced corrosion.

All such modifications and variations to the invention as would be apparent to persons skilled in the art are deemed to fall within the broad scope and ambit of the invention as defined in the appended claims.

The claims defining the invention are as follows:

1. A method of converting a sedan type vehicle into a convertible type open top vehicle, said sedan type vehicle having its roof removed and at least one door opening with opposite sides and a door, said at least one door opening having hinge mounting means at one side thereof supporting hinge means for hingedly mounting said door, and latch mounting means at the opposite side of said at least one door opening mounting latch means for latching said door in a closed position, said method including the steps of removing said door and associated hinge means and latch means, locating a rigid frame means in said door opening so that said rigid frame means extends between said opposite sides of said at least one door opening, and rigidly securing opposite ends of said frame means to said opposite sides of said door opening at said latch mounting means and said hinge mounting means respectively.

2. A method according to claim 1, wherein said frame means includes an elongated frame member provided with bracket means at opposite ends for securing said frame member to said hinge and latch mounting means at said opposite sides of said at least one door opening.

3. A method according to claim 2 wherein said hinge and latch mounting means include threaded bores and wherein said bracket means are secured to said latch and hinge mounting means by passing threaded fasteners through the bracket means at opposite sides of said door opening and into said threaded bores.

4. A method according to claim 2 wherein said bracket means are secured to said latch and hinge mounting means by welding.

5. A method according to claim 2, wherein said frame means includes a further frame member at one end of said elongated frame member, and further comprising securing said bracket means at said one end of said frame member to said further frame member.

6. A method according to claim 5, wherein said hinge mounting means comprises a pair of spaced apart hinge mounts and wherein said bracket means at said one end of said frame member comprises spaced apart brackets which corresponds to said spaced apart hinge mounts respectively.

7. A method according to claim 6, wherein said brackets are apertured and wherein said hinge mounts include threaded apertures and wherein said brackets are secured to the respective hinge mounts by passing threaded fasteners through said apertures in said brackets into said threaded apertures of said hinge mounts.

8. A method according to claim 2, wherein said frame means includes inclined members at opposite ends of said frame member extending upwardly and outwardly therefrom to the opposite sides of said door opening, said inclined members defining therebetween and with said frame member a recessed region in said at least one door opening providing access thereover to the interior of said vehicle.

9. A method according to claim 1, wherein said at least one door opening includes a sill at a lower side thereof, and further comprising securing sheeting to said frame means, said sheeting extending to the opposite sides of said at least one door opening and said sill.

10. A method according to claim 9, wherein said sheeting is adapted to be secured at least to the sill of the at least one door opening.

11. A method according to claim 1, wherein said at least one door opening comprises a door opening adjacent the driver's seat of said vehicle.

12. A method according to claim 1, wherein said at least one door opening comprises door openings on opposite sides of said vehicle and wherein said rigid frame means are provided for each said door opening.

13. A method of reinforcing a vehicle of convertible open topped form, said vehicle having at least one door opening adapted to be closed by a door, hinge mounting means at one side of said at least one opening for mounting hinge means for hingedly supporting said door, and latch mounting means at the opposite side of said at least one door opening for mounting latch means for latching said door in a closed position, said method including the steps of providing a said vehicle with said door and associated hinge means and latch means absent from said at least one door opening, providing rigid frame means, locating said rigid frame means within said at least one door opening to extend between opposite sides thereof and rigidly securing opposite ends of said frame means to said opposite sides of said at least one door opening at said hinge and latch mounting means respectively.

14. A method according to claim 13, wherein said hinge mounting means comprises spaced apart sets of threaded bores and wherein said frame means includes spaced apart brackets at one end thereof, and wherein said securing step comprises passing threaded fasteners through said brackets into said threaded bores.

15. A method according to claim 14, wherein said latch mounting means comprises threaded bores and wherein said frame means includes a further bracket at the end opposite said spaced apart brackets, and wherein said securing step further comprises passing threaded fasteners through said further bracket and into said threaded bores of said latch mounting means.

16. A method according to claim 13, wherein said frame means is secured to said hinge mounting means and said latch mounting means by welding.

17. A method according to claim 13, wherein said at least one door opening comprises a door opening adjacent the driver's seat of said vehicle.

18. A method according to claim 13, wherein said at least one door opening comprises door openings on opposite sides of said vehicle and wherein said rigid frame means are provided for each said door opening.

19. A method of reinforcing a vehicle converted from a sedan form to open topped form by having its roof removed, said vehicle having at least one door opening, hinge mounting means at one side of said door at least one opening for mounting hinge means for a door and latch mounting means at the opposite side of said door opening for mounting latch means for latching said door in a closed position, said method including the steps of providing rigid frame means, locating said rigid frame means in said at least one door opening so that said rigid frame means extends between opposite sides of said at least one door opening, said rigid frame means including bracket means at opposite ends adapted for alignment with said hinge mounting means and latch mounting means respectively, and rigidly securing said bracket means to said opposite sides of said door opening at or adjacent said hinge mounting means and latch mounting means.

* * * * *